US006240381B1

(12) United States Patent
Newson

(10) Patent No.: US 6,240,381 B1
(45) Date of Patent: May 29, 2001

(54) APPARATUS AND METHODS FOR DETECTING ONSET OF A SIGNAL

(75) Inventor: Michael W. Newson, Orem, UT (US)

(73) Assignee: Fonix Corporation, Draper, UT (US)

( * ) Notice: Subject to any disclaimer, the term of this patent is extended or adjusted under 35 U.S.C. 154(b) by 0 days.

(21) Appl. No.: 09/024,152

(22) Filed: Feb. 17, 1998

(51) Int. Cl.7 .............................. G10L 11/06; G10L 15/20
(52) U.S. Cl. ............................................. 704/214; 704/233
(58) Field of Search ..................................... 704/210, 213, 704/215, 226, 227, 233, 248, 214, 236

(56) References Cited

U.S. PATENT DOCUMENTS

| | | | | |
|---|---|---|---|---|
| 4,630,305 | * | 12/1986 | Borth et al. | 704/225 |
| 4,959,865 | * | 9/1990 | Stettiner et al. | 704/233 |
| 5,602,959 | * | 2/1997 | Bergstrom et al. | 704/205 |
| 5,649,055 | * | 7/1997 | Gupta et al. | 704/233 |
| 5,710,862 | * | 1/1998 | Urbanski | 704/208 |
| 5,787,388 | * | 7/1998 | Hayata | 704/215 |
| 5,826,230 | * | 10/1998 | Reaves | 704/248 |
| 5,884,257 | * | 3/1999 | Maekawa et al. | 704/248 |
| 6,061,651 | * | 5/2000 | Nguyen | 704/233 |

OTHER PUBLICATIONS

Malah et al., "Tracking Speech–Presence Uncertainty to Improve Speech Enhancement in Non–Stationary Noise Environments," 1999 IEEE International Conference on Acoustics, Speech, and Signal Processing, vol. 2, pp. 789–792, Mar. 1999.*

Scalart et al., "Speech Enhancement Based on A Priori Signal to Noise Estimation," 1996 IEEE International Conference on Acoustics, Speech, and Signal Processing, vol. 2, pp. 629–632, May 1996.*

* cited by examiner

*Primary Examiner*—William R. Korzuch
*Assistant Examiner*—Martin Lerner
(74) *Attorney, Agent, or Firm*—Finnegan, Henderson, Farabow, Garrett & Dunner, L.L.P.

(57) ABSTRACT

The onset of a particular signal event is determined by first smoothing the signal containing the event, and then analyzing the smoothed waveform to determine onset. Smoothing is performed by analyzing the value of each point of data and modifying the value based on previous data point values in the waveform. The smoothed waveform is analyzed by iteratively stepping through the data points of the smoothed waveform and determining event onset based on change in data point values. The analysis uses the slope of the waveform to determine whether the data point values and slopes meet certain criteria indicating an event onset.

20 Claims, 8 Drawing Sheets

APPARATUS AND METHODS FOR DETECTING ONSET OF A SIGNAL

BACKGROUND OF THE INVENTION

Apparatus and methods consistent with the present invention relate generally to detecting onset of a signal event, and in particular to apparatus and methods for detecting onset of a voicing event.

To analyze speech accurately, the point in time at which speech starts must be determined. Previous methods use a set time interval during which data is sampled and averaged over hundreds of data points. This can blur and distort time critical factors.

Raw voice data is very random and only some of the information is valuable for recognizing parts of speech. Several prior art techniques attempt to reduce the amount of randomness by processing the data into a more stable form. Typically, this has involved smoothing algorithms, which involve averaging the data. For example, a data point being analyzed is revalued by averaging the data point being smoothed with the two data points on either side of the data point being smoothed. Thus, the average of five data points is used to create the new value. This averaging, however, causes blurring of the data both in amplitude and in time. In many cases, data only exists for a portion of a millisecond. At 8 kHz sampling rate, which is a very typical sampling rate for many speech applications, the data is blurred over a 1.25 millisecond area. Thus, vital data is being destroyed by the very process of making it more useable for the algorithmic methods used to evaluate the data.

Windowing methods are another very common method of analyzing the data. Large window durations of time are often used, on the order of 25 milliseconds. The data is evaluated and averaged, with the average being calculated every 5 milliseconds. This creates a problem, for example, when analyzing information that has a just noticeable difference of one to two milliseconds. A just noticeable difference is a threshold at which a human is able to detect that a stimulus had changed, which occurs in a range of one to two milliseconds. Typically, windowing methods start sampling data at an arbitrary point in time that has no relationship to relevant portions of the data. Because of the arbitrary and random nature of the windowing, there is no way to determine where events of interest occur. An event could be bisected in the middle, thus distorting it even further. Even with smoothing the data is still too random in its motion to be able to detect the sudden onset of a signal in the midst of the randomness of noise.

The very act of arbitrary segmentation also imposes a granularity on the data. For example, if a segment is 128 samples in duration at a 44,100 Hz sampling rate, then the smallest unit of measure possible is 5.8 milliseconds, or twice the sampling rate of 2.9 milliseconds per sample (based on the Nyquist rule of two times oversampling).

Therefore, prior art smoothing techniques blur the data in both amplitude and time. Even with smoothing, the raw data in the prior art is too random to distinguish any significant features against the background of noise.

What is needed is a way to accurately determine event onset time so that signal details surrounding the event can be properly analyzed.

SUMMARY OF THE INVENTION

Systems and methods consistent with the present invention detect voice onset by distinguishing random noise from a repetitive and constant signal. This is accomplished by receiving a signal having a series of data points representing a physical event, forming a smoothed signal by selectively modifying a current data point in the series of data points based on an average of data points previous to the current data point in the series, and analyzing the smoothed signal to determine a rate of signal change indicating onset of an event.

Additional advantages of the invention will be set forth in part in the description which follows, and in part will be obvious from the description, or may be learned by practice of the invention. The objects and advantages of the invention will be realized and attained by means of the elements and combinations particularly pointed out in the appended claims. Both the foregoing general description and the following detailed description are exemplary and explanatory only, and not restrict of the invention, as claimed.

BRIEF DESCRIPTION OF THE DRAWINGS

The accompanying drawings, which are incorporated in and constitute a part of this specification, illustrate preferred embodiments consistent with the invention and, together with the description, serve to explain the principles of the invention. In the drawings.

DETAILED DESCRIPTION OF THE PREFERRED EMBODIMENTS

Reference will now be made in detail to embodiments consistent with the invention illustrated in the accompanying drawings. Wherever possible, the same reference numbers will be used throughout the drawings to refer to the same or like parts.

Introduction to Plosives

Figure 1:
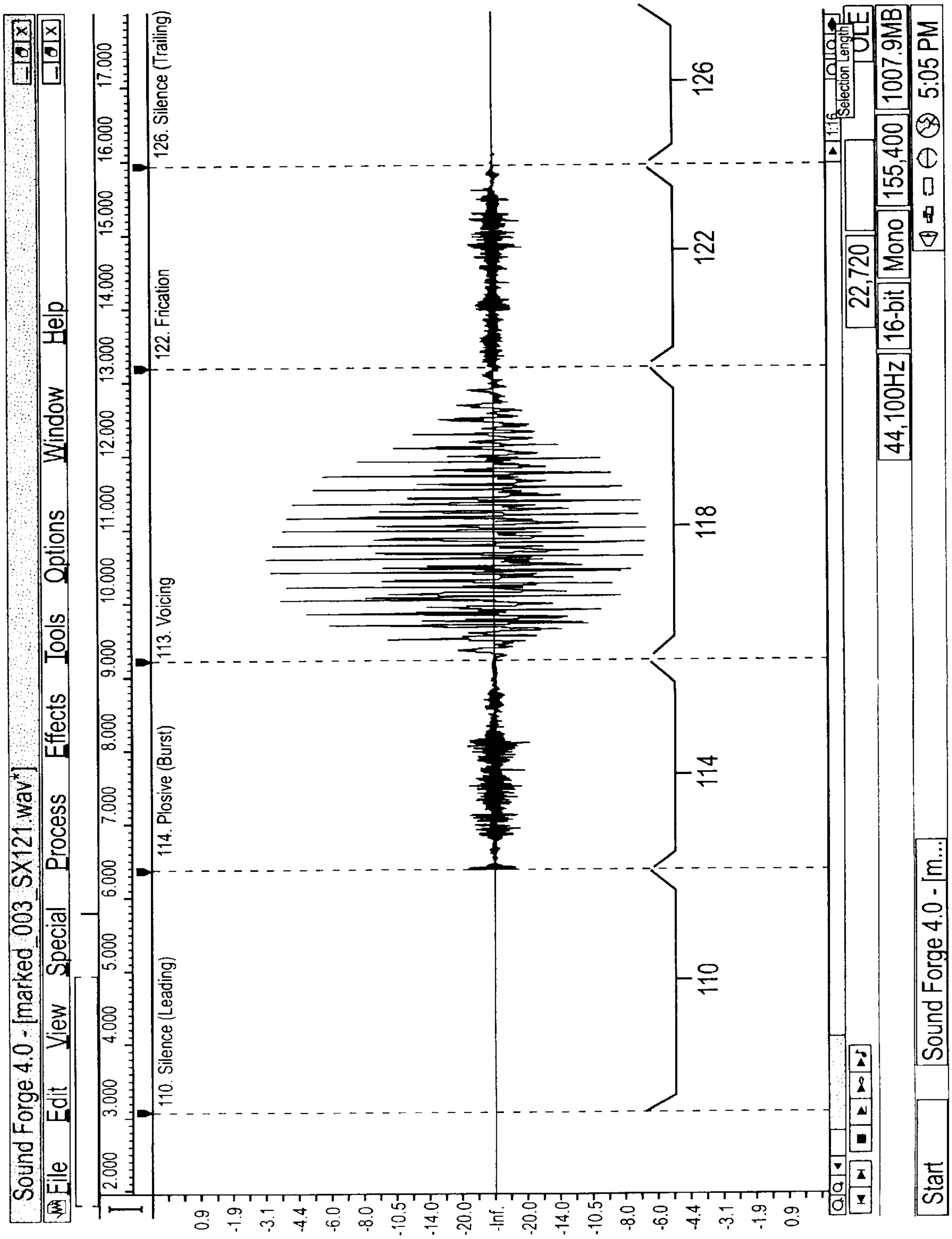
FIG. 1 shows a waveform of spoken word.

FIG. 1 shows an example of a voice waveform of the word "quiche." There are five primary parts of such a waveform. The first area, silence 110, occurs prior to the word being spoken. After silence 110, but prior to voicing 118, is the plosive 114. The plosive 114, or "burst," is the initial start of relevant information regarding the voiced word. Plosive 114 is followed by voicing 118, and voicing 118 is followed by a fricative 122. Fricative 122 is followed by silence 126.

Apparatus and methods consistent with the present invention determine timing and other characteristics of plosives. An accurate determination of the characteristics of a plosive allows accurate analysis of other areas of the voice signal, such as voicing 118. For example, the location and shape of spectral peaks in the transition region during the first 100 ms after plosive 114 are of particular interest because they provide valuable information regarding the content of what is being spoken.

To analyze plosive 114, however, the plosive must first be discriminated from other speech artifacts and noise. There are several characteristics of plosives which can be used to distinguish a plosive from another type of signal, and these characteristics can also be used to obtain information from voicing 118 following the plosive.

Speech Recognition System

Apparatus and methods consistent with the present invention receive an audio signal from an audio input device, and process the audio signal to determine plosives and other information in the audio signal. The apparatus and methods may, for example, be used as part of a system for recognizing speech.

Figure 2:
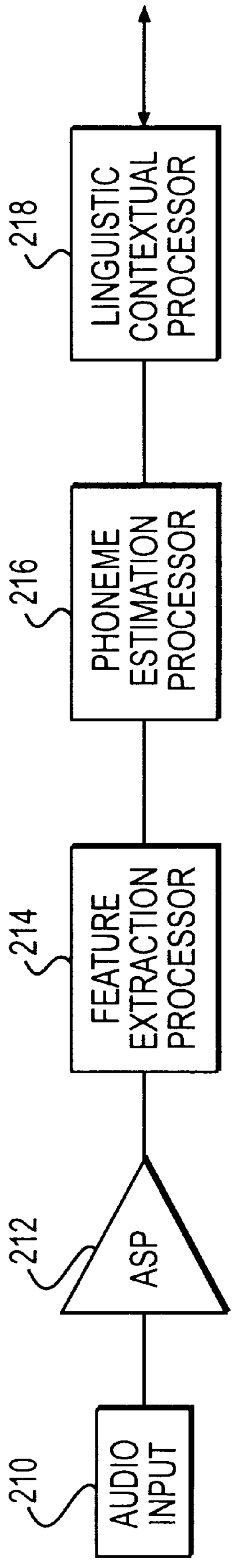
FIG. 2 is a block diagram showing a system for processing a voice signal.

FIG. 2 is a block diagram showing a speech recognition system in which apparatus and methods consistent with the present invention may be used. An audio signal is received by audio input 210, and then processed by audio signal processor (ASP) 212, feature extraction processor 214, phoneme estimation processor 216, and linguistic contextual processor 218. Linguistic contextual processor 218 outputs recognized words.

Audio input 210 receives an audio input signal, converts the audio input signal into an analog signal, and feeds the analog audio input signal to ASP 212. In a preferred embodiment, audio input 210 is a microphone. Audio input 210, however, may also be any device that carries audio information. For example, audio input 210 may be a telephone line or audio storage device, and may be analog or digital.

ASP 212 processes the audio input signal. For example, if the audio signal from audio input 210 is analog, ASP 212 converts the analog audio input into a digital signal and outputs the signal to feature extraction processors 214. In a preferred embodiment, ASP 212 includes an analog-to-digital converter and filtering components, elements which are well understood in the art. ASP 212 may also include other or additional well-known components such as a preamplifier, an antialiasing filter, and a sample and hold circuit.

Feature extraction processor 214 analyzes the digital audio signal, extracts particular features of the signal, and outputs the extracted features to phoneme estimation processor 216. Feature extraction processor 214 analyzes the digitized audio signal to determine time frame and signal characteristic information of the signal received from audio input 210. For example, feature extraction processor 214 may extract time domain and frequency domain information from the incoming signal. In a preferred embodiment, feature extraction processor 214 implements apparatus and methods for detecting plosives consistent with the present invention.

Phoneme estimation processor 216 uses the extracted features from feature extraction processor 214 to determine the most probable phonemes in the audio input analog signal. Phoneme estimation processor 216 in a preferred embodiment receives the extracted features from feature extraction processor 214, and develops estimates of the phonemes using neural networks. For example, phoneme estimation processors 216 could segment the audio signal into feature vectors to form phonemes, and then organize the phonemes according to probability. Once the most probable phonemes are determined by phoneme estimation processor 216, those phonemes are passed to linguistic contextual processor 218.

Linguistic contextual processor 218 uses contextual information of various speech to analyze the most probable phonemes received from phoneme estimation processor 210. Linguistic contextual processor 218 in a preferred embodiment consistent with the present invention comprises neural networks which analyze the phoneme estimates contextually according to sounds, words, and grammar. Linguistic contextual processor 218 then outputs words when a sufficiently high level of confidence is achieved with respect to particular words.

Feature extraction processor 214, phoneme estimation processor 216 and linguistic contextual processor 218 may be implemented as hardware, software, or a combination of hardware and software. In a preferred embodiment, each is implemented as software executed on a computer.

Plosive Detection

Consistent with the principles of the present invention, plosives are detected by first smoothing the audio signal, and then iteratively analyzing each point of the smoothed signal to determine time of plosive onset. The audio signal is smoothed by amplifying repetitive components of the signal and diminishing the effect of non-repetitive components. The step of smoothing the signal is referred to herein as Smoothing Onset Amplitude Preserved (SOAP).

Figure 3:
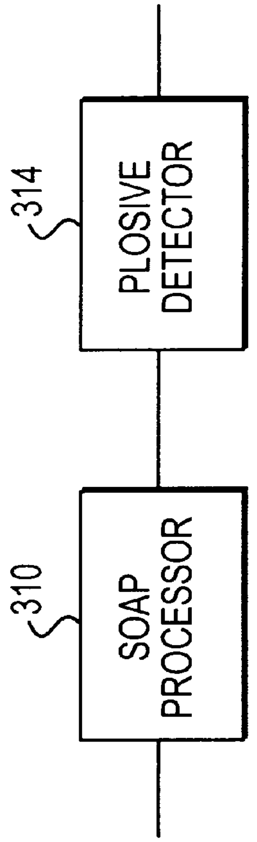
FIG. 3 is a block diagram showing an apparatus consistent with the present invention for detecting plosives.

FIG. 3 is a block diagram showing apparatus consistent with the invention for detecting plosives. The SOAP processor 310, which may reside in feature extraction processor 214, receives an audio signal and smooths the signal by amplifying repetitive components of the audio signal, and diminishing nonrepetitive components, such as speech artifacts. The digitized audio input signal is transformed into data that retains the sudden onset characteristics of a burst, and smooths the repetitive information into a continuous curve.

The plosive detector 314 then analyzes each data point of this data signal to determine the location of the plosive. For each point, plosive detector 314 determines whether the signal up to that data point is "stable." The point at which stability changes is an indication of the start of the plosive. The steps of smoothing the signal and analyzing the cleaned signal to determine the location of the plosive will now be described in greater detail.

Signal Smoothing

Figure 4:
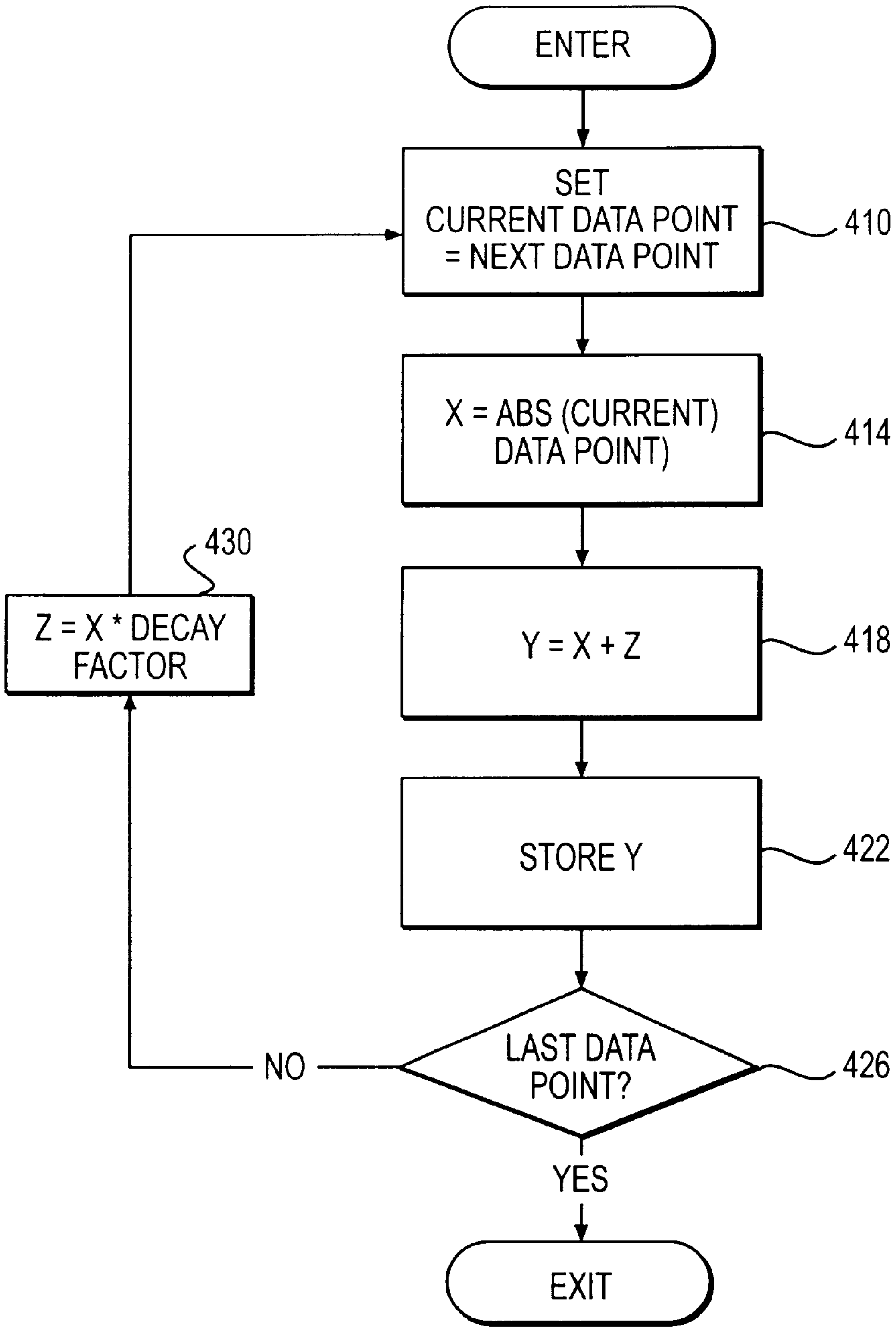
FIG. 4 is a flowchart showing processing consistent with the invention performed by SOAP processor 310 of FIG. 3.

FIG. 4 shows the signal smoothing processing performed by SOAP processor 310. The processing uses several variables. X is used as a variable representing the absolute value of a data point, Y is used to store the result of smoothing the waveform, and Z is used to hold the current absolute value of the data point decayed by a particular amount. Z has been initialized to zero before the process starts.

The current data point is first set to the next data point to be processed (step 410). X is then set to the absolute value of the current data point (step 414), and Y is set to the sum of X and Z (step 418) and stored (step 422). If the current data point is not the last data point (step 426), then Z is set to the value of X multiplied by a decay factor (step 430), and the process is repeated by setting the current data point to the next data point (step 410).

The choice of the decay factor for step 430 is very important. If there is too much decay, the data is wildly unusable. If the amount of decay is excessive the data will act in a random nature and there will be no distinguishable features. Too little decay, on the other hand, blurs everything together. Specifically, if the amount of decay is too little, one feature is blended into the next feature. In other words, the window within which the decay factor must be is small.

The equation for calculating the decay factor is:

$$DecayFactor = \mathrm{dB}(DecayValue)^{\frac{1}{Delay \times SampleRate}}$$

Delay is the length of time it takes for a signal having a particular value to reach near zero when the decay factor is applied. Therefore, the decay factor and delay are mutually dependent on each other. Sample rate is the number of points converted per second in the analog-to-digital conversion of the original audio signal.

The amount of decay dB(x), where x is Decay Value, expressed in decibels, is:

$$\mathrm{dB}(x) = 10^{-\frac{x}{20}}$$

This equation is an industry standard calculation for decibels.

The decay factor used in a preferred embodiment consistent with the present invention was determined by analyzing empirical data. As shown in the formula, the decay factor is based on the amount of decay in decibels (dB), duration of the decay in ms ("delay") and the sampling rate. To determine the optimum decay factor, a variety of combinations of decay amounts and durations were analyzed. In particular, raw audio data was subjected to the SOAP formula using various combinations of decay and delay rate. Graphs were plotted showing the resulting waveforms using the various combinations.

Each waveform was then analyzed for two factors: degree of smoothing and amount of reactivity (i.e., how fast after a signal started did it reach its maximum power). One area in particular had the largest amount of smoothing, and the greatest degree of reaction change. The inflection point at which the largest amount of smoothing and the greatest degree of reaction change takes place was at a decibel value of approximately 3 dB with a delay rate of 1/280 ms. In other words, 280 Hz at 3 dB.

The discovered inflection point is supported independently by other findings. For example, it is known that 20 ms is the smallest duration between events which is perceivable by a human. This is discussed in, for example, "Identification and Discrimination of the Relative Onset Time of Two Component Tones: Implications for Voicing Perceptions in Stops" by Pisoni '77, The Journal of the Acoustical Society of America, Vol. 61, No. 5, May 1977. When a 20 ms delay factor was imposed on the data, and it was found that the amount of decay required to attain the optimum inflection point is 16.8 dB.

A signal that is 15–18 dB below the level of surrounding stimuli is not perceivable by humans. The 18 dB level is discussed in "Psychoacoustics" by Lehiste, published in 1970. The 15 dB level was determined by the inventors in empirical testing. This data, coincidentally, is also consistent with the original inflection point findings.

The above formula is designed for samples which are consistent with the sample rate, which are evenly spaced. For irregularly spaced intervals, the decay factor must be recalculated over the particular irregularly spaced interval. Therefore, the above formula can be applied to regularly or irregularly spaced intervals. For example, if the smallest interval is 44,100 samples per second and contains three samples, then the decay factor equals the decay factor for one sample raised to the third power.

The SOAP method shown in FIG. 4 functions similar to a resistive, capacitive electronic circuit. The circuit rapidly "charges" when a signal is present, and slowly discharges unless a new stimulus is processed in time to recharge the "circuit." This accentuates signals that are regular and repetitive, and diminishes the effects of noise, which is irregular and nonrepetitive. Onsets are generally regular and repetitive, and therefore, are presented in a vividly contrasted form. Now that the signal has been "cleaned," the smoothed signal can be analyzed to determine the location of the plosive.

Figure 5:
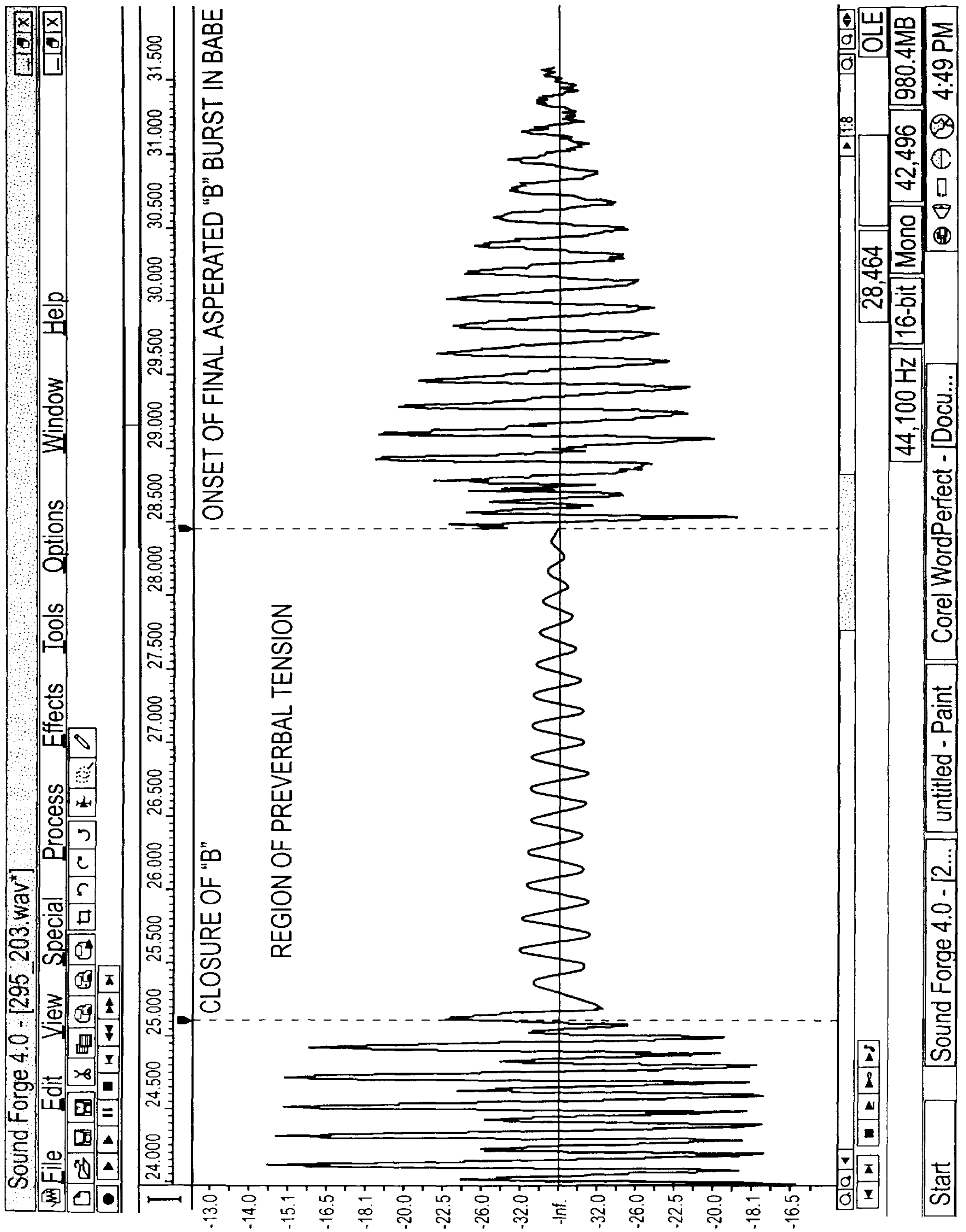
FIG. 5 shows a waveform of a word being spoken.

FIG. 5 is a screenshot showing a waveform of the closure of the second "b" in "babe." The waveform shows many areas. The first area is the voiced area prior to the detected closure, then the region of preverbal tension, where the vocal folds are still generating sound but the vocal tract is closed to build up pressure to explode the following B onset, followed by the detected "B" onset followed by a schwa, and finally aspirated sound at the close of the word. The sound has energy throughout the entire utterance. Even though there is no "silence," the onset can still be detected with extreme accuracy.

Figure 6:
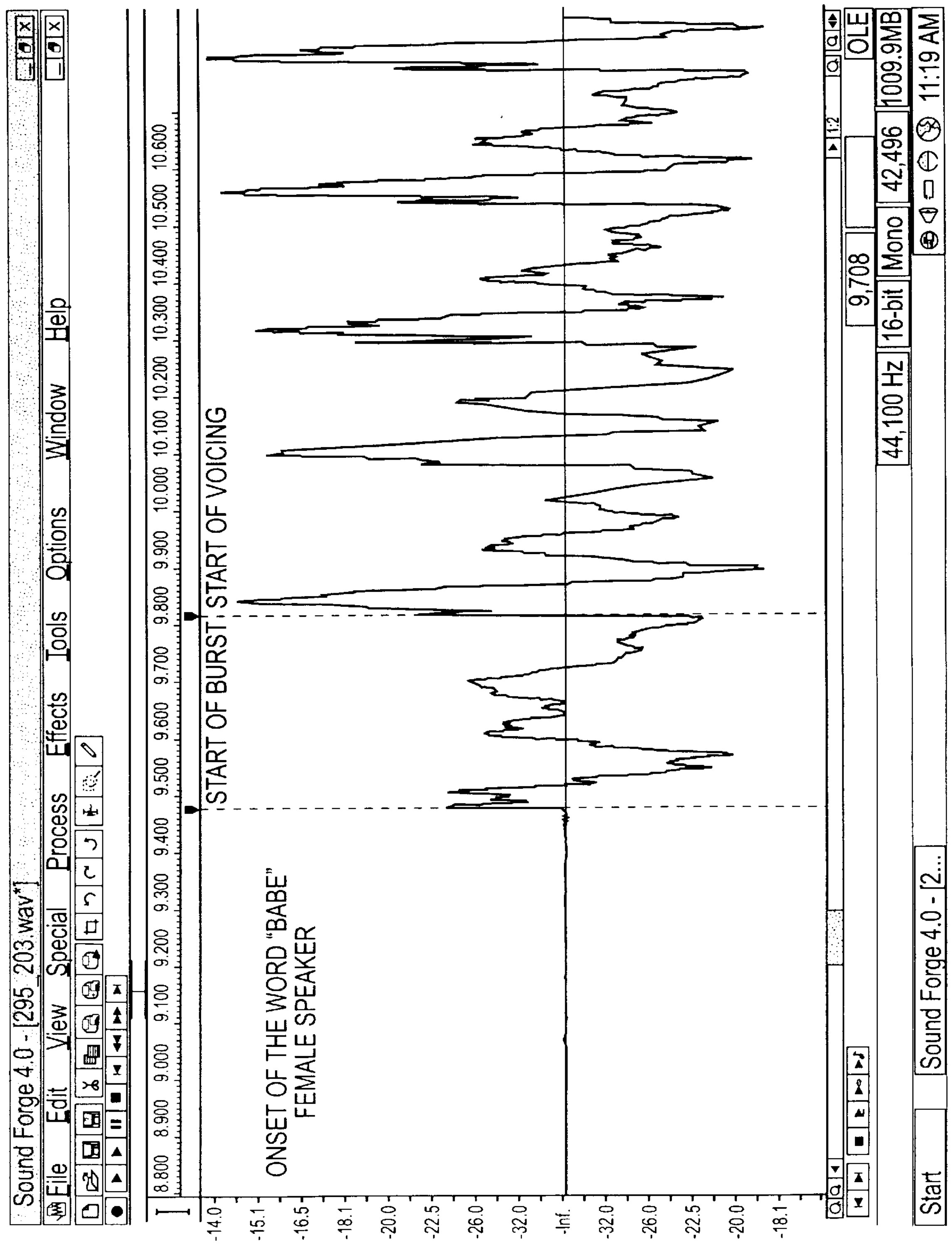
FIG. 6 shows a waveform of spoken word having silence followed by a burst and voicing.

FIG. 6 is a screenshot of a waveform showing the leading "silence" or background noise, then the detected onset of the burst, and the start of voicing milliseconds after the burst. With typical detection systems the burst and the onset of voicing would be hopelessly blurred together. Because the time period from start of burst to start of voicing is so short, there is a need for highly accurate plosive detection.

Figure 7:
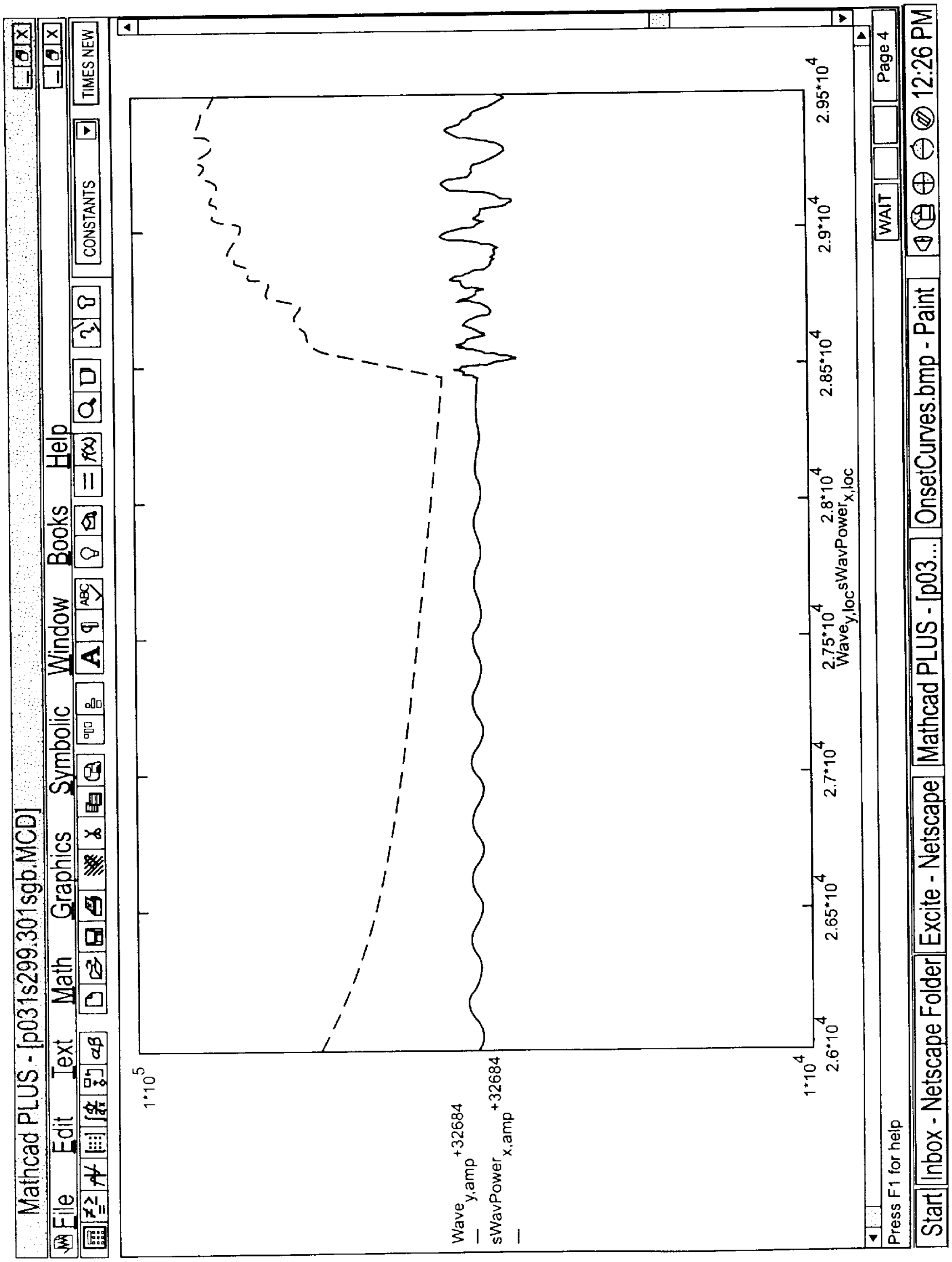
FIG. 7 is a screenshot showing closure and the start of the burst.

FIG. 7 is a screenshot showing closure and the start of the burst. The dashed line is the output of the SOAP algorithm. The solid line is the data input to the SOAP algorithm. The dashed line is very flat compared to the solid line sine wave. The SOAP curve output is highly reactive to the onset point of the burst. As can be seen by comparing the waveforms of FIG. 7 and FIG. 5, the onset shown in FIG. 5 is extremely close to data of the actual onset shown in the close up detail image of FIG. 7.

Figure 8:
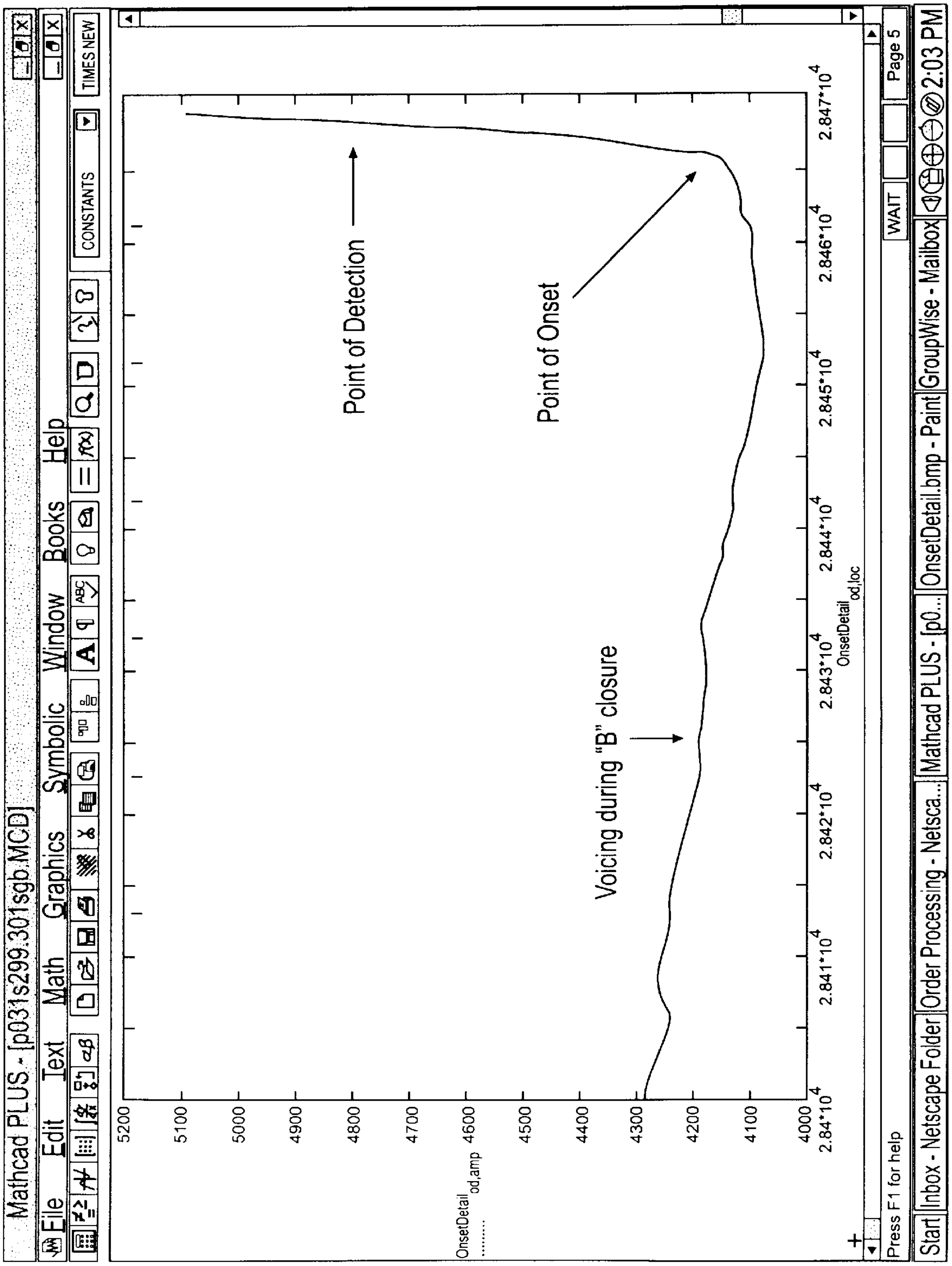
FIG. 8 is a screenshot closeup image of the onset of the "b" burst during a voiced area of speech.

FIG. 8 is a screenshot closeup image of the onset of the "b" burst during a voiced area of speech. This image is the actual data that is output from the SOAP algorithm at the onset of the burst. During the voicing the line is flat, and rises at a steep angle immediately following onset.

After the SOAP method is applied, data is virtually flat during the background noise and suddenly climbs as the plosive hits. Statistically speaking, the climb rate of the SOAP curve shows that a sudden change happened. The first section is preverbal tension, the sound made with lips closed prior to actually opening the lips to produce the "B" sound. This is followed by the plosive. The rapid climb and onset of the curve resulting from the SOAP algorithm closely matches the plosive onset. The SOAP method nearly eliminates signal variation in the area prior to the plosive. Near the plosive, however, the SOAP method preserves the onset information of the plosive.

Determine Onset

Figure 9:
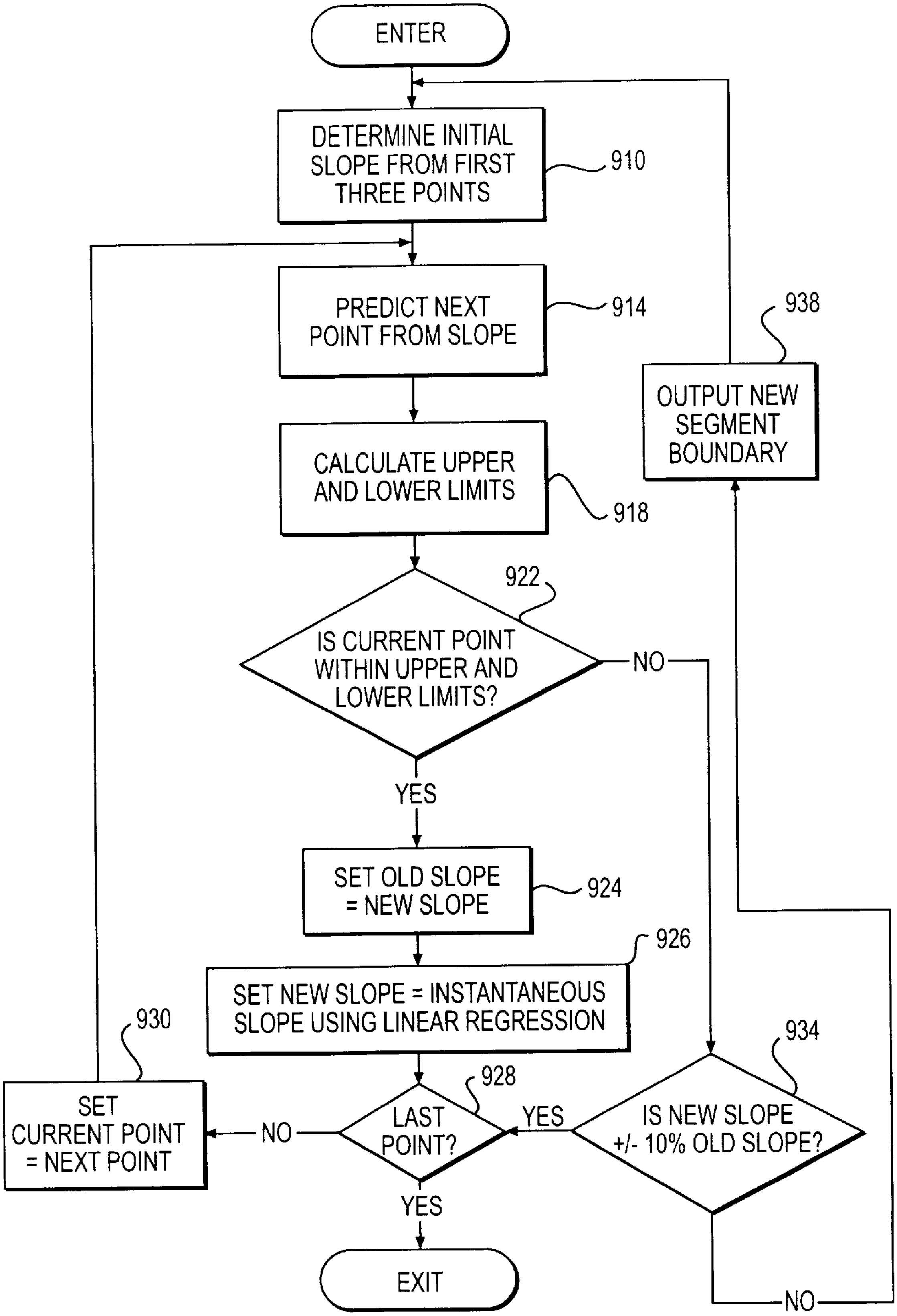
FIG. 9 is a flowchart showing the processing consistent with the invention performed by plosive detector 314 of FIG. 3.

FIG. 9 is a flow chart showing the processing performed by plosive detector 314 of FIG. 3 to find a plosive. The data being processed is the smoothed data from the SOAP processing shown in FIG. 4. An initial slope is first determined from the first several points of data. In a preferred embodiment consistent with the present invention, the first three points of smoothed data are used to determine initial slope (step 910). From the initial slope, the next point is predicted (step 914). Using the predicted point, a range defined by an upper and lower limit is calculated (step 918) by multiplying the running average by a factor.

$$UpperLimit = \frac{\sum_{k=0}^{n} i_k}{n-1} \times 10^{-\frac{\sqrt{2}}{20}}$$

$$LowerLimit = \frac{\sum_{k=0}^{n} i_k}{n-1} \times \frac{1}{10^{-\frac{\sqrt{2}}{20}}}$$

The √2 of two factor was determined empirically. The bounds both depend on the amplitude of the signal. The greater the amplitude, the wider the bounds.

A determination is then made as to whether the current data point is within the upper and lower limits (step 922). If the current data point is within the upper and lower limits, a determination is made as to whether the new slope is within ±10% of the old slope (step 934). If so, and this is not the last point (step 928), the current point is set to the next point (step 930). If not, a new segment boundary is output (step 938), and the process is repeated. A new segment boundary indicates an area where the waveform has a transition point of interest.

Returning to step 922, if the current point is within the upper and lower limits, the old slope is set to the new slope (step 924) and the new slope is set to an instantaneous slope, recalculated using linear regression (step 926). The process is repeated for the next point, if there is one (steps 928, 930).

Using the apparatus and methods consistent with the principles disclosed herein, the beginning of voicing is found by using the plosive onset information. It is known from the literature that the accuracy required to detect which phoneme of a plosive is being spoken is on the order of 1–2 ms. This requires accuracies on the order of 0.25 ms to 0.5 ms to avoid distorting the data and exceeding the Nyquist sampling rate. Using the apparatus and methods disclosed herein, voice onset times have been measured for the "B" plosive in which the entire duration from the plosive to the onset of voicing is only eleven thousandths of a second. Thus, methods and apparatus consistent with the present invention are very sensitive and reactive to changes in both amplitude and frequency. The apparatus and methods disclosed herein may be used for detecting onsets of signals at other points in the data.

Plosive Characteristics

Plosives have many characteristics in addition to start time and duration. Some of these characteristics are useful in distinguishing a plosive from other types of signals, and in analyzing post-plosive signals.

The time between the start of a plosive burst and the start of the following voiced area is called the voiced onset time (VOT). VOT differs depending upon voicing. For example, VOT for labial plosives is approximately 10 ms less than the typical voiced onset average and for velar plosives is approximately 10 ms greater than the average. VOT increases in general if the formant number one (F1) is low in frequency for the following segment. VOT has been determined to be basic determinant in natural languages.

Table 1 shows average VOTs for a variety of individual letters and letter combinations.

TABLE 1

Average Voiced Onset Times (in ms).

| Voiced | Voiceless | /s/ Clusters |
|---|---|---|
| /b/ 11 | /p/ 47 | /sp/ 12 |
| /d/ 17 | /t/ 65 | /st/ 23 |
| /g/ 27 | /k/ 70 | /sk/ 30 |
| /br/ 14 | /pr/ 59 | /spr/ 18 |
| /dr/ 25 | /tr/ 93 | /str/ 37 |
| /gr/ 35 | /he/ 84 | /she/ 35 |
| /bl/ 13 | /pi/ 61 | /spl/ 16 |
| /gl/ 26 | /kl/ 77 | /skw/ 39 |
| | /tw/ 102 | |
| | /kw/ 94 | |

The mean VOT for voiced plosives is 18 ms before a vowel and 23 ms before a sonorant consonant. The corresponding mean for voiceless plosives (not preceded by /s/) are 61 ms before a vowel and 81 ms before sonorant consonants. The VOT increases from /p/ to /t/ to /k/. The VOT increases when the plosive is followed by sonorant consonant, and the VOT for /s/-plosive clusters is similar to VOT values for the corresponding voiced plosive. If voicing onset is delayed by more than about 20 to 25 ms relative to plosive release, plosive and voicing are perceived as two separate events and a voiceless plosive is likely to be heard. If the VOT is less than about 20 ms, the plosive and voicing onset are perceived as occurring simultaneously, as in a voiced plosive.

A tense lax determinant feature in plosives can be determined using fundamental formant frequency (F0). The F0 for a vowel following a voiced plosive typically exhibits a rising trend with the reverse occurring for a unvoiced plosive.

The closure interval is the period from the end of the preceding periodicity or noise to the plosive release which is signaled by an abrupt increase in acoustic energy across the frequency range. The onset and offset of a closure are usually visible in a spectrographic display, but the definition of labial (/b/, /p/) plosives can be more problematic as the amplitude of the release is usually weak—an articulatory consequence of the front location of the constriction for which there is no adjacent resonant cavity; the waveform can provide an additional means of examining this interval.

The release interval is measured from the onset of plosive release to that point on the time waveform which shows (appropriately) periodicity, or the onset of noise or silence. Voiceless aspirated plosives are further delineated into intervals of frication and aspiration; this last is a voiceless version of the following vowel, and although it should be included as part of the release interval, it should be interpreted with caution when assessing the plosive frequency of the release.

The profile is the cross-sectional snap-shot of the frequency x amplitude over a selected time interval. It displays the plosive frequency and the relative amplitudes of the other concentrations of spectral energy.

The cut-off is obtained from a cross-sectional facility; the spectral energy of the noise release of the plosive is integrated over the time period to provide the maximal spectral amplitude in the display where it covers the greater part of the spectrum. The cut-off may be an acoustic feature which enables the refinement of plosive identification according to place of articulation.

A short anterior resonant chamber will result in high-frequency free poles, and conversely, a long anterior resonant tube will display low-frequency prominences. A low amplitude, diffuse spectrum without any spectral prominences is predicted for the bilabial stricture (/p, b/). Primary concentration of energy is in the frequency range of 500–1500 Hz. A. relatively high amplitude, high frequency spectrum is predicted for the alveolar (/d, t/) stricture. Plosives are characterized by energy greater than 3.7 KHz before rounded or retroflexed vowels, and less than 3.7 KHZ before all other vowels. A relatively high-amplitude, low frequency spectrum (1.2 KHz/1.77 KHz before un-rounded vowels and 1.25 KHz before rounded vowels) is generated by the velar (/g, k/) stricture before a back vowel. A relatively high amplitude, and mid-to-high frequency spectrum, occurs before front vowels (the energy lies around 3.2 to 2.72 KHZ).

Intensity has been used to separate bilabials as a class from alveolars and velars, (the RMS amplitude is around 12 dB less than alveolars and velars in a balanced context, i.e. the lowest amplitude of release).

A plosive may have several energy distribution characteristics. A diffuse distribution indicates an approximately equal distribution of energy across the frequency spectrum, with no one peak dominant in amplitude by more than 20 "units" between 800–3000 Hz. Compact distribution of energy indicates the presence of a prominent single peak which exceeds the amplitude of any other peak in the pertinent range of the spectrum between 800–3000 Hz and which persists over time (i.e. at least 30 ms.)

Plosives also have a range of frequencies. Typical bilabial frequencies are in the range of 100–1500 Hz; alveolar, 2400–4000 Hz; and velar, 300–3000 Hz.

Aspiration for plosives is weaker in intensity and tends to excite all but the first formant. Strong excitation of the fourth, fifth, and higher formants is usually seen in the burst of frication noise at the release of a /t/. The /k/ plosive is distinguished by a strong concentration of noise energy that is continuous with the third formant before front vowels, or continuous with the second formant before back vowels. The frication plosive in /p/ is frequently too weak and spectrally diffuse to be differentiated from the aspiration interval.

Plosive duration for /b, d, g/ average to be approximately 13, 21, and 29 ms, respectively. Plosive durations are 5 to 10 ms longer for voiceless aspirated plosives, than for voiced plosives.

The presence of low frequency energy due to voiced excitation of a low first-formant frequency immediately following plosive release suggest a voiced plosive. In a voiceless plosive, the formant transitions that indicate release of an oral occlusion (first formant) and place of articulation (second and third formants) are nearly completed before voicing onset and the low frequency cue is absent (at least for a following vowel with a high first-formant). The relative cue must be the presence or absence of energy in the frequency region below 300 Hz following voicing onset. The phoneme boundary, as measured in terms of voicing onset, may be delayed by as much as 15 ms if there is a significant rise in the first formant frequency starting at voicing onset.

The peak intensity and the duration of frication noise are greater at the release of a voiceless plosive. The physical intensity of the frication noise is proportional to the three-halves power of pressure drop across the constriction, all else being equal. The perceptual loudness of the plosive is proportional to both its intensity and its duration because the plosive is short in duration relative to the averaging time constant for loudness judgements. Differences in duration are sufficient to make the plosive perceived at least 4 dB louder in a voiceless plosive.

The duration of the plosive also offers many insights into the following voicing period. Potential durational cues include the duration of the previous segment and the duration of the plosive itself. In English, for example, a vowel or sonorant followed by a voiceless plosive is significantly shorter in duration than it would be before a voiced plosive. The durational difference in the segment preceding the plosive is as much as 34 % in phrase-final syllables, but the contrast is not a great in other positions. English has expanded on this universal tendency for vowel duration to be shorter before /p, t, k/. English speakers have adopted a phonological rule making durational difference large enough to be perceptually relevant, that is phonemic.

Prevoicing of a plosive occurs whenever the vocal folds are positioned for voicing before an oral occlusion is achieved, that is, when a trans-glottal pressure drop is present at the onset of the closure interval. The spectrum of prevoicing contains only low-frequency harmonics because the first formant is low (about 200 Hz during closure) and sound radiation through the tissues attenuates the higher frequencies. 20 ms is about the minimal difference in onset time needed to identify the temporal order of two distinct events. Stimuli with onset times greater than about 20 ms are perceived as successive events; stimuli with onset times less than about 20 ms are perceived as simultaneous events.

Conclusion

It will be apparent to those skilled in the art that various modifications and variations can be made in embodiments consistent with the present invention and in construction of the disclosed apparatus and methods consistent with the invention without departing from the scope or spirit of the invention. For example, the disclosed plosive detection technique consistent with the invention could be used to detect onsets in other types of signals.

Other embodiments of the invention will be apparent to those skilled in the art from consideration of the specification and practice of the disclosed embodiments. For example, the invention consistent with the disclosure may be embodied in software media, such as on a disk, in hardware form, or as a combination of software and hardware. Moreover, if embodied in whole or in part in software, the invention consistent with the principles herein may be embodied in communications media, such as by transfer over the Internet. The specification and examples are exemplary only, and the true scope and spirit of the invention is defined by the following claims and their equivalents.

I claim:

1. Apparatus for determining onset of an event, comprising:

receiver means for receiving a signal having a series of data points representing a physical event;

modifying means for forming a smoothed signal by selectively modifying a current data point in the series of data points, the modifying means comprising:

multiplication means for forming a multiplied value by multiplying a previous data point value by a predetermined value, wherein the multiplication means comprise scaling means for reducing a previous data point based on an amount of time between successive data points, and addition means for adding the multiplied value to the current data point; and onset detection means for analyzing the smoothed signal to determine a predetermined rate of signal change.

2. Apparatus for determining onset of an event, comprising:

receiver means for receiving a signal having a series of data points representing a physical event;

modifying means for forming a smoothed signal by selectively modifying a current data point in the series of data points, the modifying means comprising:

multiplication means for forming a multiplied value by multiplying a previous data point value by a predetermined value, wherein the multiplication means comprise scaling means for reducing a previous data point based on a sampling rate of the data points, and addition means for adding the multiplied value to the current data point; and onset detection means for analyzing the smoothed signal to determine a predetermined rate of signal change.

3. Apparatus for determining onset of an event, comprising:

receiver means for receiving a signal having a series of data points representing a physical event;

modifying means for forming a smoothed signal by selectively modifying a current data point in the series of data points, the modifying means comprising:

multiplication means for forming a multiplied value by multiplying a previous data point value by a predetermined value, wherein the multiplication means comprise means for reducing a previous data point by a decay factor determined according to the following equation:

$$DecayFactor = \mathrm{dB}(DecayValue)^{\frac{1}{Delay \times SampleRate}},$$

where Delay is the length of time for a signal to reach near zero when the Decay Factor is applied, dB (Decay Value) is Decay Value expressed in decibels, and Sample Rate is a rate at which the data points were sampled, and addition means for adding the multiplied value to the current data point; and onset detection means for analyzing the smoothed signal to determine a predetermined rate of signal change.

4. Apparatus for determining onset of an event, comprising:

receiver means for receiving a signal having a series of data points representing a physical event;

modifying means for forming a smoothed signal by selectively modifying a current data point in the series of data points, the modifying means comprising:

multiplication means for forming a multiplied value by multiplying a previous data point value by a predetermined value, and addition means for adding the multiplied value to the current data point;

onset detection means for analyzing the smoothed signal to determine a predetermined rate of signal change further comprising:

boundary determination means for determining whether a current data point is within a predetermined data value range, slope means, responsive to the boundary determination means, for determining a slope of a line segment associated with the current data point when the data point is outside the predetermined data value range, and comparison means for comparing the slope of a line segment associated with the current data point with a slope of a line segment associated with a previous data point.

5. Apparatus for determining onset of an event, comprising:

receiver means for receiving a signal having a series of data points representing a physical event;

modifying means for forming a smoothed signal by selectively modifying a current data point in the series of data points, the modifying means comprising:

multiplication means for forming a multiplied value by multiplying a previous data point value by a predetermined value, and addition means for adding the multiplied value to the current data point;

onset detection means for analyzing the smoothed signal to determine a predetermined rate of signal change further comprising:

boundary determination means for determining whether a current data point is within a predetermined data value range, slope means, responsive to the boundary determination means, for determining a slope of a line segment associated with the current data point when the data point is outside the predetermined data value range, limit determination means for maintaining a running average, and for determining the predetermined data value range by adding a range value to and subtracting a range value from the running average, and means for determining the predetermined data value range having an upper limit equal to $$\frac{\sum_{k=0}^{n} i_k}{n-1} \times 10^{-\frac{\sqrt{2}}{20}},$$ and a lower limit equal to $$\frac{\sum_{k=0}^{n} i_k}{n-1} \times \frac{1}{10^{-\frac{\sqrt{2}}{20}}},$$

where $i_k$ equals the $k^{th}$ data point I, and n represents the number of the data point being averaged.

6. A method for determining onset of an event, comprising the steps of:

receiving a signal having a series of data points representing a physical event;

forming a smoothed signal by selectively modifying a current data point in the series of data points, wherein the step of forming includes the substeps of:

multiplying a previous data point value by a predetermined value to form a multiplied value, wherein the substep of multiplying includes the substep of reducing a previous data point based on an amount of time between successive data points, and adding the multiplied value to the current data point; and analyzing the smoothed signal to determine a predetermined rate of signal change.

7. A method for determining onset of an event, comprising the steps of:

receiving a signal having a series of data points representing a physical event;

forming a smoothed signal by selectively modifying a current data point in the series of data points, wherein the step of forming includes the substeps of:

multiplying a previous data point value by a predetermined value to form a multiplied value, wherein the substep of multiplying includes the substep of reducing a previous data point based on a sampling rate used to obtain the data points, and adding the multiplied value to the current data point; and analyzing the smoothed signal to determine a predetermined rate of signal change.

8. A method for determining onset of an event, comprising the steps of:

receiving a signal having a series of data points representing a physical event;

forming a smoothed signal by selectively modifying a current data point in the series of data points, wherein the step of forming comprises the substeps of:

multiplying a previous data point value by a predetermined value to form a multiplied value, wherein the substep of reducing a data point includes the substeps of reducing a previous data point by a decay factor determined according to the following equation:

$$DecayFactor = \text{dB}(DecayValue)^{\frac{1}{Delay \times SampleRate}},$$

wherein Delay is the length of time for a signal to reach near zero when the Decay Factor is applied, dB (Decay Value) is Decay Value expressed in decibels, and Sample Rate is a rate at which the data points were sampled, and adding the multiplied value to the current data point; and analyzing the smoothed signal to determine a predetermined rate of signal change.

9. A method for determining onset of an event, comprising the steps of:

receiving a signal having a series of data points representing a physical event;

forming a smoothed signal by selectively modifying a current data point in the series of data points, wherein the step of forming comprises the substeps of:

multiplying a previous data point value by a predetermined value to form a multiplied value, and adding the multiplied value to the current data point;

analyzing the smoothed signal to determine a predetermined rate of signal change, wherein the substep of analyzing comprises the substeps of:

determining whether a current data point is within a predetermined data value range, and determining a slope of a line segment associated with the current data point when the data point is outside the predetermined data value range; and comparing the slope of a line segment associated with the current data point with a slope of a line segment associated with a previous data point.

10. A method for determining onset of an event, comprising the steps of:

receiving a signal having a series of data points representing a physical event;

forming a smoothed signal by selectively modifying a current data point in the series of data points, wherein the step of forming comprises the substeps of:

multiplying a previous data point value by a predetermined value to form a multiplied value, and adding the multiplied value to the current data point; and analyzing the smoothed signal to determine a predetermined rate of signal change, wherein the substep of analyzing comprises the substeps of:

determining whether a current data point is within a predetermined data value range, and determining a slope of a line segment associated with the current data point when the data point is outside the predetermined data value range;

maintaining a running average;

determining the predetermined data value range by adding a range value to and subtracting a range value from the running average; and determining the predetermined data value range having an upper limit equal to $$\frac{\sum_{k=0}^{n} i_k}{n-1} \times 10^{-\frac{\sqrt{2}}{20}}, \text{ and a lower limit equal to } \frac{\sum_{k=0}^{n} i_k}{n-1} \times \frac{1}{10^{-\frac{\sqrt{2}}{20}}},$$

where $i_k$ equals the $k^{th}$ data point I, and n represents the number of the data point being averaged.

11. Computer readable media encoded with a method for determining onset of an event, comprising the steps of:

receiving a signal having a series of data points representing a physical event;

forming a smoothed signal by selectively modifying a current data point in the series of data points, wherein the step of forming comprises the substeps of:

multiplying a previous data point value by a predetermined value to form a multiplied value, wherein the substep of multiplying includes the substeps of reducing a previous data point based on an amount of time between successive data points, and adding the multiplied value to the current data point; and analyzing the smoothed signal to determine a predetermined rate of signal change.

12. The media according to claim 11, wherein the substep of multiplying includes the substep of reducing a previous data point based on a sampling rate used to obtain the data points.

13. Computer readable media encoded with a method for determining onset of an event, comprising the steps of:

receiving a signal having a series of data points representing a physical event;

forming a smoothed signal by selectively modifying a current data point in the series of data points, wherein the step of forming comprises the substeps of:

multiplying a previous data point value by a predetermined value to form a multiplied value, wherein the substep of multiplying includes the substep of reducing a previous data point based on a sampling rate used to obtain the data points, and wherein the substep of reducing a data point includes the substep of reducing a previous data point by a decay factor determined according to the following equation:

$$DecayFactor = \text{dB}(DecayValue)^{\frac{1}{Delay \times SampleRate}},$$

wherein Delay is the length of time for a signal to reach near zero when the Decay Factor is applied, dB (Decay Value) is Decay Value expressed in decibels, and Sample Rate is a rate at which the data points were sampled, and adding the multiplied value to the current data point; and analyzing the smoothed signal to determine a predetermined rate of signal change.

14. Computer readable media encoded with a method for determining onset of an event, comprising the steps of:

receiving a signal having a series of data points representing a physical event;

forming a smoothed signal by selectively modifying a current data point in the series of data points, wherein the step of forming comprises the substeps of:

multiplying a previous data point value by a predetermined value to form a multiplied value, and adding the multiplied value to the current data point;

analyzing the smoothed signal to determine a predetermined rate of signal change, wherein the step of analyzing includes the substeps of:

determining whether a current data point is within a predetermined data value range, and determining a slope of a line segment associated with the current data point when the data point is outside the predetermined data value range; and comparing the slope of a line segment associated with the current data point with a slope of a line segment associated with a previous data point.

15. Computer readable media encoded with a method for determining onset of an event, comprising the steps of:

receiving a signal having a series of data points representing a physical event;

forming a smoothed signal by selectively modifying a current data point in the series of data points, wherein the step of forming comprises the substeps of:

multiplying a previous data point value by a predetermined value to form a multiplied value, and adding the multiplied value to the current data point;

analyzing the smoothed signal to determine a predetermined rate of signal change, wherein the step of analyzing includes the substeps of:

determining whether a current data point is within a predetermined data value range, and determining a slope of a line segment associated with the current data point when the data point is outside the predetermined data value range; maintaining a running average;

determining the predetermined data value range by adding a range value to and subtracting a range value from the running average; and determining the predetermined data value range having an upper limit equal to $$\frac{\sum_{k=0}^{n} i_k}{n-1} \times 10^{-\frac{\sqrt{2}}{20}}, \text{ and a lower limit equal to } \frac{\sum_{k=0}^{n} i_k}{n-1} \times \frac{1}{10^{-\frac{\sqrt{2}}{20}}},$$

where $i_k$ equals the $k^h$ data point I, and n represents the number of the data points being averaged.

16. In a system which receives a signal representing a physical event, an apparatus for detecting onset, comprising:

receiver means for receiving a signal having a series of data points representing a physical event;

modifying means for forming a smoothed signal by selectively modifying a current data point in the series of data points, the modifying means comprising:

multiplication means for forming a multiplied value by multiplying a previous data point value by a predetermined value, wherein the multiplication means comprise scaling means for reducing a previous data point based on an amount of time between successive data points, and addition means for adding the multiplied value to the current data point; and onset detection means for analyzing the smoothed signal to determine a predetermined rate of signal change.

17. In a system which receives a signal representing a physical event, an apparatus for detecting onset, comprising:

receiver means for receiving a signal having a series of data points representing a physical event;

modifying means for forming a smoothed signal by selectively modifying a current data point in the series of data points, the modifying means comprising:

multiplication means for forming a multiplied value by multiplying a previous data point value by a predetermined value, wherein the multiplication means comprise scaling means for reducing a previous data point based on a sampling rate of the data points, and addition means for adding the multiplied value to the current data point; and onset detection means for analyzing the smoothed signal to determine a predetermined rate of signal change.

18. In a system which receives a signal representing a physical event, an apparatus for detecting onset, comprising:

receiver means for receiving a signal having a series of data points representing a physical event;

modifying means for forming a smoothed signal by selectively modifying a current data point in the series of data points, the modifying means including:

multiplication means for forming a multiplied value by multiplying a previous data point value by a predetermined value, wherein the multiplication means comprise means for reducing a previous data point by a decay factor determined according to the following equation:

$$DecayFactor = \mathrm{dB}(DecayValue)^{\frac{1}{Delay \times SampleRate}},$$

where Delay is the length of time for a signal to reach near zero when the Decay Factor is applied, dB (Decay Value) is Decay Value expressed in decibels, and Sample Rate is a rate at which the data points were sampled, and addition means for adding the multiplied value to the current data point; and onset detection means for analyzing the smoothed signal to determine a predetermined rate of signal change.

19. In a system which receives a signal representing a physical event, an apparatus for detecting onset, comprising:

receiver means for receiving a signal having a series of data points representing a physical event;

modifying means for forming a smoothed signal by selectively modifying a current data point in the series of data points, the modifying means comprising:

multiplication means for forming a multiplied value by multiplying a previousdata point value by a predetermined value, and addition means for adding the multiplied value to the current data point; and onset detection means for analyzing the smoothed signal to determine a predetermined rate of signal change, wherein the onset detection means comprise boundary determination means for determining whether a current data point is within a predetermined data value range, slope means, responsive to the boundary determination means, for determining a slope of a line segment associated with the current data point when the data point is outside the predetermined data value range, and comparison means for comparing the slope of a line segment associated with the current data point with a slope of a line segment associated with a previous data point.

20. In a system which receives a signal representing a physical event, an apparatus for detecting onset, comprising:

receiver means for receiving a signal having a series of data points representing a physical event;

modifying means for forming a smoothed signal by selectively modifying a current data point in the series of data points, the modifying means including:

multiplication means for forming a multiplied value by multiplying a previousdata point value by a predetermined value, and addition means for adding the multiplied value to the current data point; and onset detection means for analyzing the smoothed signal to determine a predetermined rate of signal change, wherein the onset detection means comprise boundary determination means for determining whether a current data point is within a predetermined data value range;

slope means, responsive to the boundary determination means, for determining a slope of a line segment associated with the current data point when the data point is outside the predetermined data value range;

limit determination means for maintaining a running average, and for determining the predetermined data value range by adding a range value to and subtracting a range value from the running average, and means for determining the predetermined data value range having an upper limit equal to $$\frac{\sum_{k=0}^{n} i_k}{n-1} \times 10^{-\frac{\sqrt{2}}{20}}, \text{ and a lower limit equal to } \frac{\sum_{k=0}^{n} i_k}{n-1} \times \frac{1}{10^{-\frac{\sqrt{2}}{20}}},$$

where $i_k$ equals the $k^{th}$ data point I, and n represents the number of the data points being averaged.

* * * * *